United States Patent
Salvi et al.

(10) Patent No.: US 11,474,953 B2
(45) Date of Patent: Oct. 18, 2022

(54) CONFIGURATION CACHE FOR THE ARM SMMUV3

(71) Applicant: Marvell Asia Pte, Ltd., Singapore (SG)

(72) Inventors: Manan Salvi, Newton, MA (US); Albert Ma, Belmont, MA (US)

(73) Assignee: MARVELL ASIA PTE, LTD., Singapore (SG)

( * ) Notice: Subject to any disclaimer, the term of this patent is extended or adjusted under 35 U.S.C. 154(b) by 213 days.

(21) Appl. No.: 16/158,443

(22) Filed: Oct. 12, 2018

(65) Prior Publication Data
US 2020/0117613 A1   Apr. 16, 2020

(51) Int. Cl.
*G06F 12/1045* (2016.01)
*G06F 12/0871* (2016.01)
*G06F 12/0868* (2016.01)

(52) U.S. Cl.
CPC ...... *G06F 12/1045* (2013.01); *G06F 12/0868* (2013.01); *G06F 12/0871* (2013.01)

(58) Field of Classification Search
CPC .............. G06F 12/1045; G06F 12/0871; G06F 12/0868; G06F 2212/1041; G06F 2212/651; G06F 2212/657; G06F 2212/1024; G06F 12/1036
See application file for complete search history.

(56) References Cited

U.S. PATENT DOCUMENTS

| | | | |
|---|---|---|---|
| 2005/0216656 A1* | 9/2005 | Rosenbluth | G11C 15/00 711/108 |
| 2015/0095610 A1* | 4/2015 | Ben-Meir | G06F 12/1036 711/207 |
| 2015/0120978 A1* | 4/2015 | Kalyanasundharam | G06F 12/1009 710/267 |

(Continued)

OTHER PUBLICATIONS

"ARM® System Memory Management Unit Architecture Specification, SMMU architecture version 3.0 and version 3.1;" 2016; ARM Limited; version 3.0 and version 3.1; pp. 24-25, 113, 115-116, 130, 145-146, 174, and 387 (Year: 2016).*

*Primary Examiner* — Charles Rones
*Assistant Examiner* — Tong B. Vo
(74) *Attorney, Agent, or Firm* — Hamilton, Brook, Smith & Reynolds, P.C.

(57) ABSTRACT

A method of translating a virtual address into a physical memory address in an ARM System Memory Management Unit version 3 (SMMUv3) system includes searching a Configuration Cache memory for a matching tag that matches an associated tag upon receiving the virtual address and the associated tag, and extracting, in a single memory lookup cycle, a matching data field associated with the matching tag when the matching tag is found in the Configuration Cache memory. A matching data field of the Configuration Cache memory includes a matching Stream Table Entry (STE) and a matching Context Descriptor (CD), both associated with the matching tag. The Configuration (Continued)

Cache memory may be configured as a content-addressable memory. The method further includes storing entries associated with a multiple memory lookup cycle virtual address-to-physical address translation into the Configuration Cache memory, each of the entries including a tag, an associated STE and an associated CD.

21 Claims, 4 Drawing Sheets

(56) References Cited

U.S. PATENT DOCUMENTS

| | | | |
|---|---|---|---|
| 2015/0278112 A1* | 10/2015 | Gschwind | G06F 9/3824 |
| | | | 711/205 |
| 2018/0114023 A1* | 4/2018 | Bakthavatchalam | |
| | | | H04L 63/145 |
| 2019/0018777 A1* | 1/2019 | Swaine | G06F 12/0808 |
| 2020/0021528 A1* | 1/2020 | Sharma | H04L 61/5007 |

* cited by examiner

CONFIGURATION CACHE FOR THE ARM SMMUV3

BACKGROUND

A System Memory Management Unit (SMMU) translates virtual memory addresses to physical memory addresses on behalf of input/output (I/O) devices. In general, the translation process may require multiple steps, each step relying on tables stored in memory. As accessing memory is relatively slow, it is advantageous to cache the results of the translation, as well as any intermediate steps, so that subsequent accesses to similar memory locations can skip the memory accesses, thereby speeding up the translation process. An SMMU has the additional burden of having to translate for multiple devices, each potentially owned by a different guest and thus possibly having to translate differently for each device.

The ARM SMMUv3 translation environment supports a large number of devices and two stage translation. Devices present memory requests to the SMMU as a quadruple:

StreamID (SID)—identifies the particular device (or virtual device) initiating the request.
Substream-valid (SSV)—indicates whether a valid SubstreamID is associated with this translation.
SubstreamID (SSID)—further identifies the process in the case that the device is virtualized on per-process level.
Virtual Address—the virtual address of the memory the device wants to access. This address must be translated to a physical memory address.

The SMMU defines two sets of structures—a Stream Table and a Context Descriptor Table. The Stream Table configures the second stage of translation and optionally points to the Context Descriptor Table, which configures the first stage of translation. A Stream Table Entry (STE) is selected out of the Stream Table based on the SID, thus there is a one-to-one mapping of SIDs to STEs. A Context Descriptor (CD) is selected out of the Context Descriptor Table based on the SSID. As the location of the Context Descriptor Table itself comes from the Stream Table Entry, there is a many-to-one mapping of SID/SSID to CDs.

SUMMARY

The described embodiments are directed to a cache, referred to herein as a Configuration Cache, for use by a System Memory Management Unit (SMMU) in an ARM processing environment. The example embodiments described herein are with respect to an ARM SMMUv3. As used herein, an ARM refers to a family of reduced instruction set computing (RISC) architectures as is known in the art.

The SMMU translates virtual memory addresses to physical memory addresses on behalf of one or more client devices. In the described embodiments, the Configuration Cache stores, for each address translation, the Stream Table Entry (STE) and Context Descriptor (CD) together, based on the combination of the associated StreamID (SID) and SubstreamID. The Configuration Cache stores the STE and CD, along with associated tags, for translations that have been accomplished using a standard multi-cycle (multiple memory lookup cycle) translation process according to the ARM SMMUv3 specification. The described embodiments facilitate the use of a single cache for the STE and the CD, rather than a separate cache for each of the STE and the CD.

When a virtual address is to be translated, the SMMU receives a query tag associated with the virtual address. The SMMU searches the Configuration Cache for a stored tag that matches the query tag. If a match is found, the SMMU uses the STE and CD for the translation, rather than performing the standard multi-cycle translation process. Doing so reduces the number of cycles (and consequently the amount of time) necessary to perform the translation. The described embodiments thus collapse the two nested table lookups, which are described in the ARM SMMUv3 specification into a single lookup.

In one aspect, the invention may be a method of translating a virtual address into a physical memory address in an ARM SMMUv3 memory management system. The method may comprise, upon receiving the virtual address and an associated tag, searching a Configuration Cache memory for a matching tag that matches the associated tag. The method may further comprise extracting, in a single memory lookup cycle, a matching data field associated with the matching tag when the matching tag is found in the Configuration Cache memory. The matching data field of the Configuration Cache may comprise a matching Stream Table Entry (STE) and a matching Context Descriptor (CD), both associated with the matching tag.

The method may further comprise organizing the Configuration Cache as a content-addressable memory (CAM). The method may further comprise storing one or more entries associated with a multiple memory lookup cycle virtual address-to-physical address translation into the Configuration Cache memory, each of the one or more entries comprising a tag, an associated STE and an associated CD. Each tag in the Configuration Cache memory may comprise a valid field, a StreamID (SID) field, a Substream-valid (SSV) field, and a SubstreamID (SSID) field, and interpreting 15 lowest significance bits of the SID field as ternary bits.

The method may further comprise performing a translation of the virtual address into the physical memory address utilizing the matching STE and the matching CD. The method may further comprise a system memory management unit (SMMU) submitting a query tag, based on the associated tag, to the Configuration Cache memory for the searching. The method may further comprise performing a multiple memory lookup cycle virtual address-to-physical address translation when a matching tag is not found in the Configuration Cache memory, and storing a corresponding entry in the Configuration Cache memory. The corresponding entry may comprise a translation tag comprising a translation valid field, a translation SID field, a translation SSV field, and a translation SSID field, and a translation data field comprising a translation STE and a translation CD.

The method of may further comprise performing an STE invalidation operation by identifying entries having identical values in their respective SID fields and corresponding valid fields set to a value of 1, and resetting the corresponding valid fields of the identified entries to a value of 0. The method may further comprise performing a CD invalidation operation by identifying entries having identical values in their respective SID fields, identical values in their respective SSID fields, corresponding valid fields set to a value of 1, and corresponding SSV fields set to a value of 1, and resetting the corresponding valid fields of the identified entries to a value of 0. The method may further comprise (i) when an entry to be stored in the Configuration Cache has its SSV field set to 0, storing the entry with its SSV field set to 0 and its SSID field set to 0, and (ii) while performing the CD invalidation operation, ignoring the corresponding SSV fields for entries with SSID fields set to 0.

In another aspect, the invention may be a system for translating a virtual address from a client device into a physical memory address for addressing a physical memory device. The system may comprise a Configuration Cache memory, a system memory management unit (SMMU) operatively coupled to the client device, the physical memory device, and the Configuration Cache memory. The SMMU may be configured to, upon receiving the virtual address and an associated tag, search the Configuration Cache memory for a matching tag. The SMMU may be further configured to extract, in a single memory lookup cycle, a data field associated with the matching tag when a matching tag is found in the Configuration Cache memory. Each data field of the Configuration Cache may comprise a Stream Table Entry (STE) and a context Descriptors (CD) associated with the matching tag.

The SMMU may be further configured to organize the Configuration Cache as a content-addressable memory (CAM). The SMMU may be further configured to store at least one entry associated with a multiple memory lookup cycle virtual address-to-physical address translation into the Configuration Cache memory, the at least one entry comprising a tag, an associated STE and an associated CD. The SMMU may be further configured to perform a translation of the virtual address into the physical memory address utilizing the STE and the CD associated with the matching tag.

The SMMU may be further configured to submit a query tag, based on the associated tag, to the Configuration Cache memory for the search.

The SMMU may be further configured to perform a multiple memory lookup cycle virtual address-to-physical address translation when a matching tag is not found in the Configuration Cache memory, and store a corresponding entry in the Configuration Cache memory. The corresponding entry may comprise (i) a translation tag, which comprises a translation valid field, a translation SID field, a translation SSV field, and a translation SSID field, and (ii) a translation data field, which comprises a translation STE and a translation CD.

The SMMU may be further configured to perform an STE invalidation operation by identifying entries having identical values in their respective SID fields and corresponding valid fields set to a value of 1, and resetting the corresponding valid fields of the identified entries to a value of 0.

The SMMU may be further configured to perform a CD invalidation operation by identifying entries having identical values in their respective SID fields, identical values in their respective SSID fields, corresponding valid fields set to a value of 1, and corresponding SSV fields set to a value of 1, and resetting the corresponding valid fields of the identified entries to a value of 0.

The SMMU may be further configured to (i) when an entry to be stored in the Configuration Cache has its SSV field set to 0, store the entry with its SSV field set to 0 and its SSID field set to 0, and (ii) while performing the CD invalidation operation, ignore the corresponding SSV fields for entries with SSID fields set to 0.

In an embodiment, each tag in the Configuration Cache memory may comprise a StreamID (SID) field, and wherein 15 lowest significance bits of the SID field are ternary bits.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

The described embodiments are directed to a cache, referred to herein as a Configuration Cache, for use by a System Memory Management Unit (SMMU) in an ARM processing environment. The example embodiments described herein are with respect to an ARM SMMUv3. As used herein, an ARM refers to a family of reduced instruction set computing (RISC) architectures as is known in the art.

Figure 1:
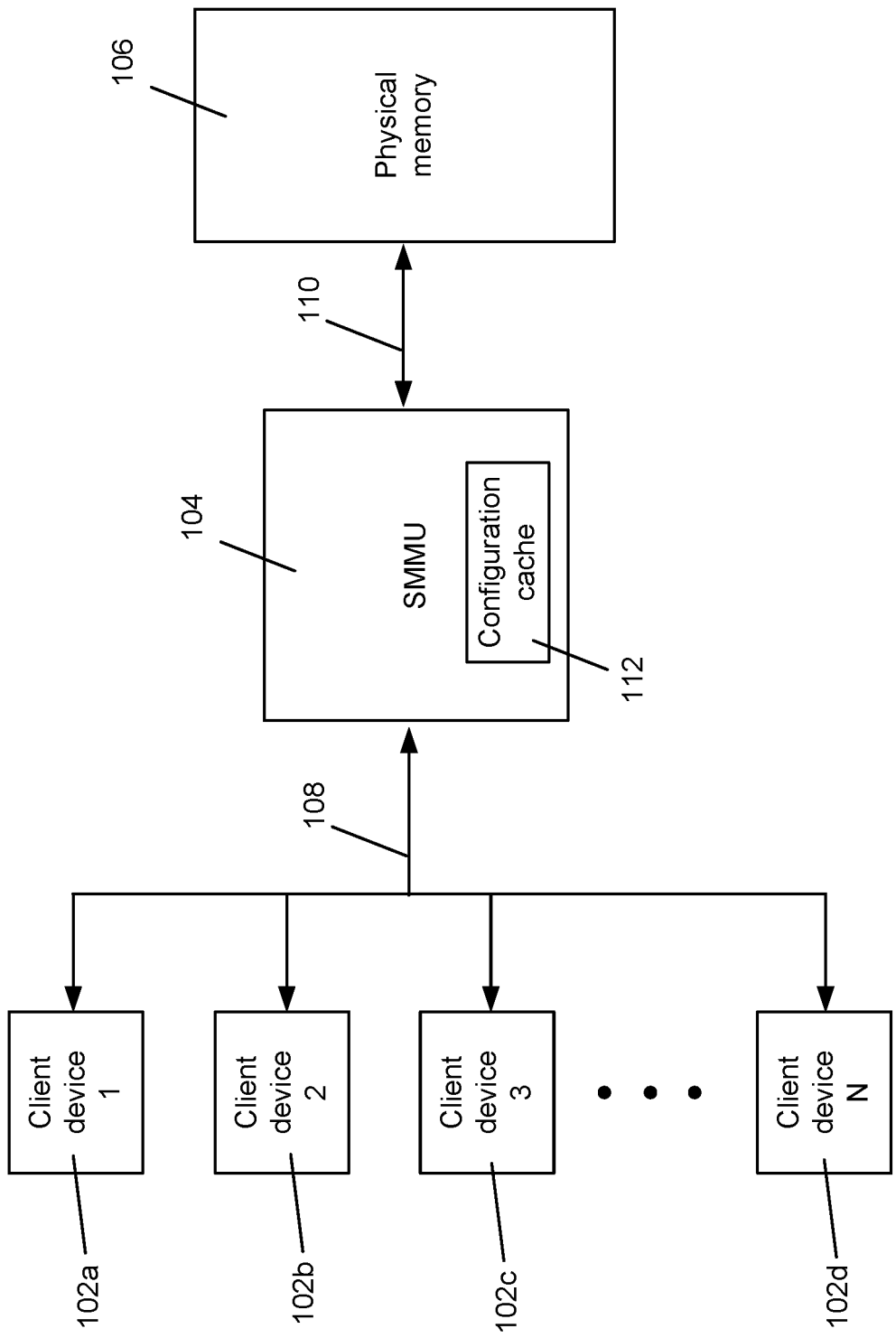
FIG. 1 shows a block-diagram of an example architecture that incorporates an SMMU, according to the invention.

FIG. 1 illustrates a block-diagram of an example architecture that incorporates an SMMU. The architecture depicts an integer number N of client devices 102a through 102d, an SMMU 104, and a physical memory device 106. As described herein, the SMMU may translate virtual memory addresses 108 to physical memory addresses 110 on behalf of the client devices 102a through 102d. The SMMU 104 may utilize the Configuration Cache 112 to facilitate the translation. Although the Configuration Cache 112 is shown as part of the SMMU 104 in this example, it should be understood that the Configuration Cache 112 may be a component separate from the SMMU 104. Alternatively, a first portion of the Configuration Cache 112 may be a part of the SMMU 104, while a remaining portion of the Configuration Cache 112 may be separate from the SMMU 104.

Figure 2:
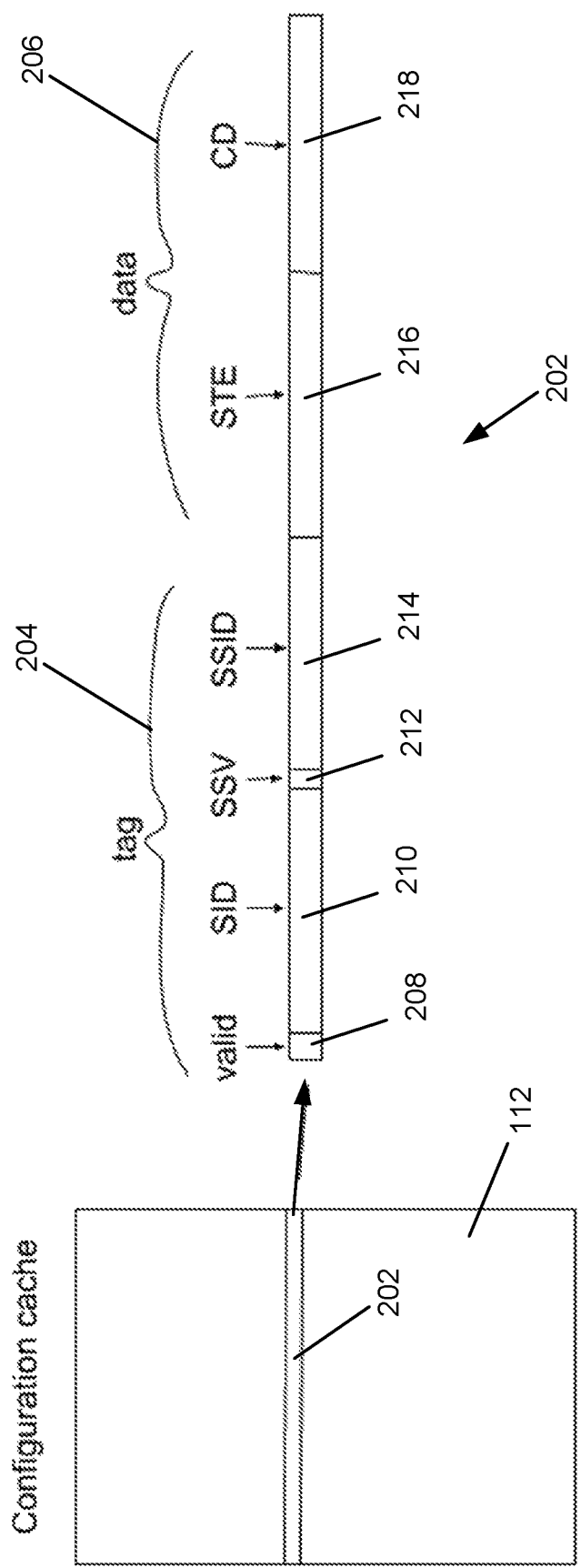
FIG. 2 shows an example Configuration Cache and its structure, according to the invention.

The Configuration Cache is used to store Stream Table Entries (STEs) and context Descriptors (CDs), to be used by the SMMU 104 to translate the virtual addresses from the client device(s) into physical addresses for use by a physical memory device. FIG. 2 shows an example Configuration Cache 112 and its structure. The Configuration Cache 112 is organized as a Content-Addressable Memory (CAM), with each entry 202 comprising a tag field 204 and a data field 206. The tag field 204 comprises a valid field 208, an StreamID (SID) field 210, an Substream-valid (SSV) field 212, and an SubstreamID (SSID) field 214. The data field 206 comprises an Stream Table Entry (STE) field 216 and a Context Descriptor (CD) field 218.

The SMMU 104 may submit a query tag as an input to the Configuration Cache 112. The Configuration Cache 112 searches its contents for an entry with a tag that matches the query tag, and returns the data 206 associated with the matching tag. The valid field 208 distinguishes a valid entry in the Configuration Cache 112 from an invalid entry. On reset, all valid bits are cleared (i.e., set to 0, designating not an invalid entry). Accordingly, the Configuration Cache 112 produces a STE/CD pair on every cycle (memory lookup cycle), with low latency.

In operation, every incoming translation request is presented to the Configuration Cache 112. A translation request comprises a query tag associated with the virtual address to be translated. If a search of the Configuration Cache 112 results in a matching entry (in terms of the valid 208, SID 210, SSV 212, and SSID 214 fields) existing within the Configuration Cache 112, the Configuration Cache 112 produces the associated data field 206 (which comprises STE 216 and CD 218), and subsequently uses the information from the data field 206 to translate the virtual address.

If no matching entry is found, the STE and CD for the query tag are fetched from memory using the multiple step procedure as established in the ARM SMMUv3 architectural specification. Fetching the STE from memory requires up to two sequential memory accesses and, further, fetching the CD requires up to an additional 10 sequential memory accesses. The STE and CD are then stored into the Configuration Cache 112 for subsequent re-use.

The ARM SMMUv3 does not require hardware support for coherence for configuration structure caches. Rather, it defines invalidation operations that software can issue to maintain coherence.

In the case of an STE invalidation operation, the Configuration Cache 112 may be searched for entries with the same value in their SID fields 210 and the corresponding valid fields 208 set to 1. The valid fields 208 may then be set to 0 for all such matching entries.

In the case of a CD invalidation operation, the Configuration Cache 112 is searched for entries with the same value in their SID fields 210, the same value in their SSID fields 214, and the corresponding valid fields 208 set to 1, and corresponding SSV fields 212 set to 1. The valid fields are then set to 0 for all such matching entries.

A complication can arise because a transaction with SSV field 212 set to 0 may, in some cases, fetch the CD corresponding to SSID=0. In the described embodiments, a CD invalidation operation will invalidate any entry with its SSID field set to 0 due to two factors. First, the described embodiments store such entries in the Configuration Cache 112 with the SSV field 212 set to 0, and the SSID field 214 set to 0, regardless of what SSV and SSID values were passed to the SMMU. Second, CD invalidations for entries with SSID set to 0 will ignore the SSV field in the tag during the invalidation operation.

The use of the Configuration Cache 112 improves the performance of the SMMU. Throughput improves because the SMMU is now able to handle one request per cycle. Without the Configuration Cache 112, the memory system would require up to 12 times the roundtrip memory latency, as compared to operation using the Configuration Cache 112, in the number of outstanding requests to match that throughput. Such latency is not practical. Further, the translation latency drops by up to 12 times the roundtrip memory latency.

The described embodiments are superior to alternative cache organizations. For example, an alternative organization would be two independent Content-Addressable Memories (CAMs) accessed in parallel, one of which holds STE entries, and one of which holds CD entries. In the case of process-virtualized devices, this alternative would have the advantage of only storing one copy of the STE in total instead of one copy per process. The disadvantage is that the SID fields in the tag are replicated. In addition, there is some extra area overhead of having an additional CAM structure. Since process-virtualization is expected to be lightly used in the common case, the replicated SID fields and extra area overhead are not justified.

The ARM SMMUv3 allows for multiple devices (up to 32,768 devices) spanning an SID range to share identical STE configurations, thereby possibly saving space in a cache. This may be implemented in the Configuration Cache 112 by making the lower 15 bits of the SID field 210 in the tag 204 ternary CAM bits. A Ternary CAM bit can encode the states 1, 0, and X, where X indicates that the bit in question always results in a match, regardless of the associated bit in the query tag (in other words, ignore that bit). The value of the field CONT in the STE may be used to indicate the number of low-order bits in the SID to ignore. Those bits will be written as X when the STE is stored. When doing any lookup or invalidation, any SID within the range of the ignore bits will match.

Figure 3:
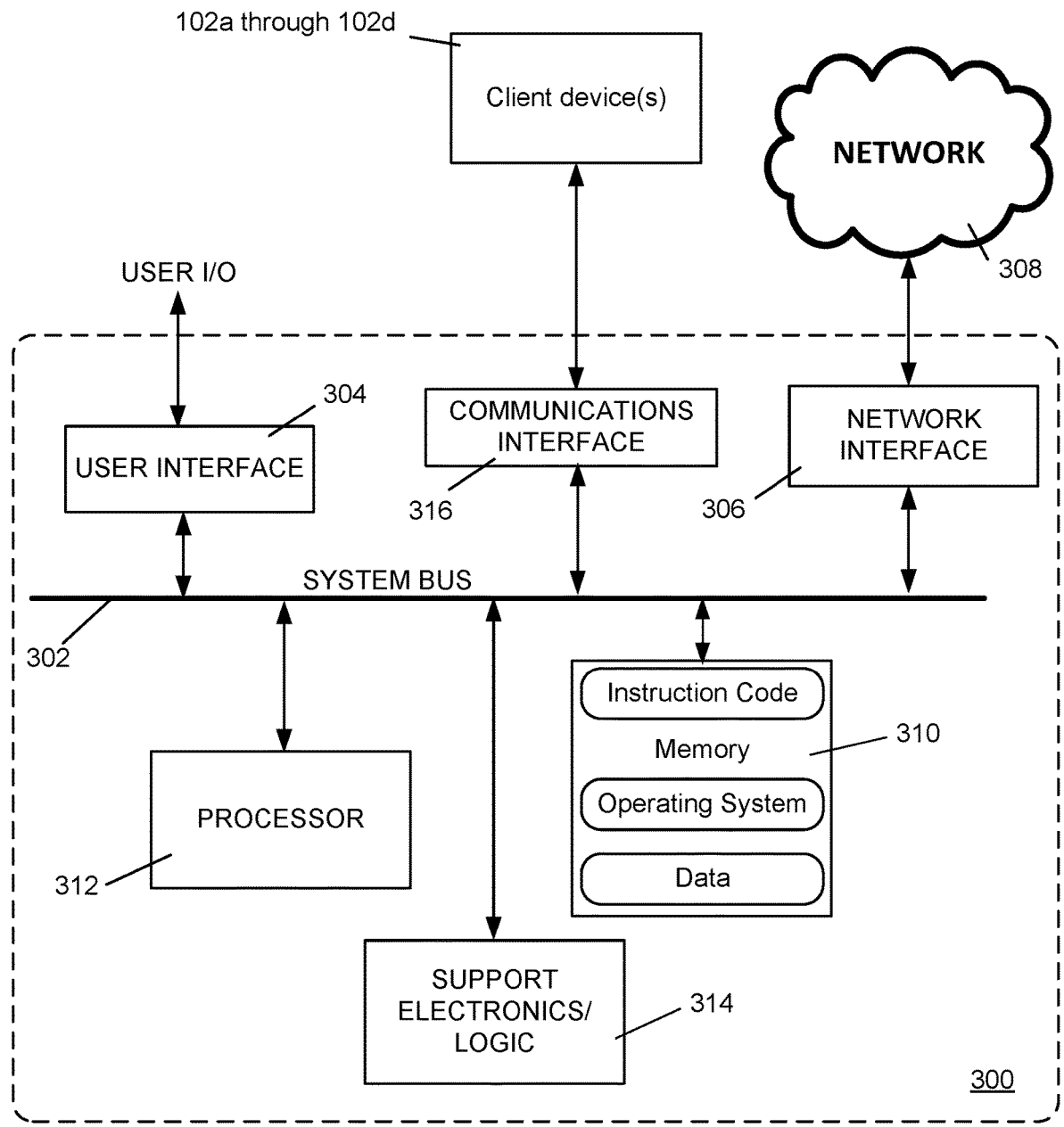
FIG. 3 is a diagram of an example internal structure of a processing system that may be used to implement one or more of the embodiments herein.

FIG. 3 is a diagram of an example internal structure of a processing system 300 that may be used in association with one or more of the embodiments herein. Each processing system 300 contains a system bus 302, where a bus is a set of hardware lines used for data transfer among the components of a computer or processing system. The system bus 302 is essentially a shared conduit that connects different components of a processing system (e.g., processor, disk storage, memory, input/output ports, network ports, etc.) that enables the transfer of information between the components.

Attached to the system bus 302 is a user I/O device interface 304 for connecting various input and output devices (e.g., keyboard, mouse, displays, printers, speakers, etc.) to the processing system 300. A network interface 306 allows the computer to connect to various other devices attached to a network 308. Memory 310 provides volatile and non-volatile storage for information such as computer software instructions used to implement one or more of the embodiments of the present invention described herein, for data generated internally and for data received from sources external to the processing system 300.

A central processor unit 312 is also attached to the system bus 302 and provides for the execution of computer instructions stored in memory 310. The system may also include support electronics/logic 314, and a communications interface 316. The communications interface may comprise the interface to the client devices 102a through 102d described with reference to FIG. 1.

In one embodiment, the information stored in memory 310 may comprise a computer program product, such that the memory 310 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

In an embodiment, the SMMU described herein may be implemented as part of, or in association with, the system bus 302. Each access to the memory 310, with the exception of those initiated by the central processor unit 312 (which comprises a facility having functionality similar to that of the SMMU), is translated by the SMMU.

Figure 4:
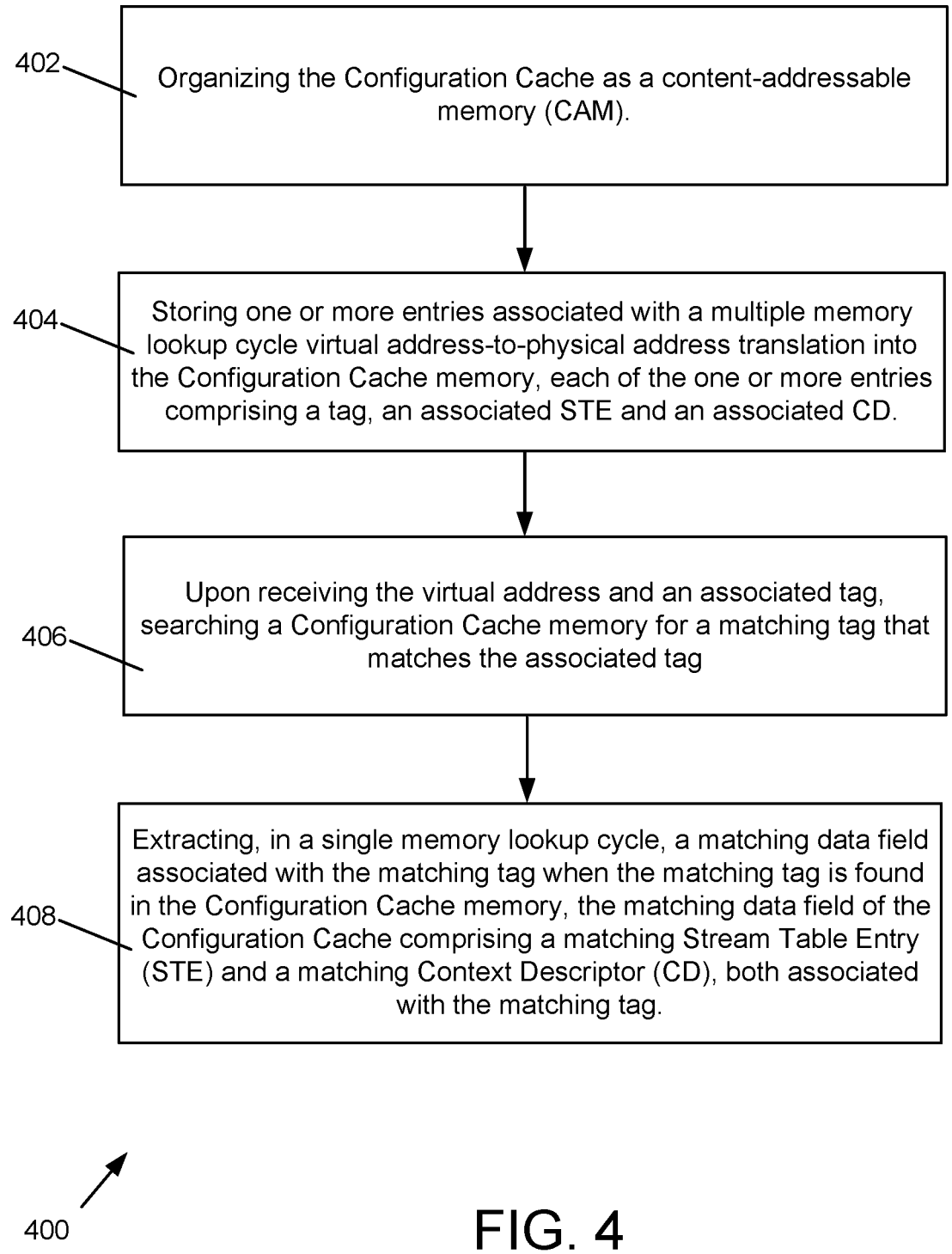
FIG. 4 illustrates an example method of translating a virtual address into a physical memory address in an ARM SMMUv3 memory management system, according to the invention.

FIG. 4 illustrates an example method 400 of translating a virtual address into a physical memory address in an ARM SMMUv3 memory management system, according to the invention. The example method comprises organizing 402 a Configuration Cache as a content-addressable memory (CAM). The method further comprises storing 404 one or more entries associated with a multiple memory lookup cycle virtual address-to-physical address translation into the Configuration Cache memory, each of the one or more entries comprising a tag, an associated STE and an associated CD. The method further comprises, upon receiving the virtual address and an associated tag, searching 406 the Configuration Cache memory for a matching tag that matches the associated tag. The method further comprises extracting 408, in a single memory lookup cycle, a matching data field associated with the matching tag when the matching tag is found in the Configuration Cache memory, the matching data field of the Configuration Cache comprising a matching Stream Table Entry (STE) and a matching Context Descriptor (CD), both associated with the matching tag.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While example embodiments have been particularly shown and described, it will be understood by those skilled in the art that various changes in form and details may be made therein without departing from the scope of the embodiments encompassed by the appended claims.

What is claimed is:

1. A method of translating a virtual address into a physical memory address in an ARM System Memory Management Unit Version 3 (SMMUv3) memory management system, comprising:
   upon receiving the virtual address and an associated tag, searching a Configuration Cache memory for a matching tag that matches the associated tag with respect to at least one of (i) a valid field, (ii) a StreamID (SID) field, (iii) a Substream-valid (SSV) field, and (iv) a SubstreamID (SSID) field;
   extracting, in a single memory lookup cycle, a matching data field associated with the matching tag when the matching tag is found in the Configuration Cache memory, the matching data field of the Configuration Cache memory comprising a matching Stream Table Entry (STE) and a matching Context Descriptor (CD), both associated with the matching tag;
   the SMMUv3 memory management system is further configured to perform a multiple memory lookup cycle virtual address-to-physical address translation when the matching tag is not found in the Configuration Cache memory, and store a corresponding entry in the Configuration Cache memory; and
   each tag in the Configuration Cache memory comprises the SID field, and wherein lowest significance bits of the SID field comprise at least one ternary bit.

2. The method of claim 1, further comprising organizing the Configuration Cache memory as a content-addressable memory (CAM).

3. The method of claim 1, further comprising storing one or more entries associated with the multiple memory lookup cycle virtual address-to-physical address translation into the Configuration Cache memory, each of the one or more entries comprising a tag, an associated STE and an associated CD.

4. The method of claim 3, wherein each tag in the Configuration Cache memory comprises the valid field, the StreamID (SID) field, the Substream-valid (SSV) field, and the SubstreamID (SSID) field, and interpreting 15 of the lowest significance bits of the SID field as ternary bits.

5. The method of claim 1, further comprising performing a translation of the virtual address into the physical memory address utilizing the matching STE and the matching CD.

6. The method of claim 1, further comprising a system memory management unit (SMMU) submitting a query tag, based on the associated tag, to the Configuration Cache memory for the searching.

7. The method of claim 1, wherein the corresponding entry comprising (i) a translation tag comprising a translation valid field, a translation SID field, a translation SSV field, and a translation SSID field, and (ii) a translation data field comprising a translation STE and a translation CD.

8. The method of claim 1, further comprising performing an STE invalidation operation by identifying entries having identical values in their respective SID fields and corresponding valid fields set to a value of 1, and resetting the corresponding valid fields of the identified entries to a value of 0.

9. The method of claim 1, further comprising performing a CD invalidation operation by identifying entries having identical values in respective SID fields, identical values in respective SSID fields, corresponding valid fields set to a value of 1, and corresponding SSV fields set to a value of 1, and resetting the corresponding valid fields of the identified entries to a value of 0.

10. The method of claim 9, further comprising (i) when an entry to be stored in the Configuration Cache memory has the SSV field set to 0, storing the entry with the SSV field set to 0 and the SSID field set to 0, and (ii) while performing the CD invalidation operation, ignoring the corresponding SSV fields for entries with the respective SSID fields set to 0.

11. The method of claim 1, wherein upon receiving the virtual address and the associated tag, searching the Configuration Cache memory for the matching tag that matches the associated tag with respect to (i) the valid field and (ii) the Substream-valid (SSV) field.

12. A system for translating a virtual address from a client device into a physical memory address for addressing a physical memory device, comprising:
   a Configuration Cache memory;
   a system memory management unit (SMMU) operatively coupled to the client device, the physical memory device, and the Configuration Cache memory, the SMMU configured to
   upon receiving the virtual address and an associated tag, search the Configuration Cache memory for a matching tag with respect to at least one of (i) a valid field, (ii)

a StreamID (SID) field, (iii) a Substream-valid (SSV) field, and (iv) a SubstreamiD (SSID) field;

extract, in a single memory lookup cycle, a data field associated with the matching tag when a matching tag is found in the Configuration Cache memory, each data field of the Configuration Cache memory comprising a Stream Table Entry (STE) and a context Descriptors (CD) associated with the matching tag; and configure the SMMU to perform a multiple memory lookup cycle virtual address-to-physical address translation when the matching tag is not found in the Configuration Cache memory, and store a corresponding entry in the Configuration Cache memory;

each tag in the Configuration Cache memory comprises the SID field, and wherein lowest significance bits of the SID field comprise at least one ternary bit.

13. The system of claim 12, wherein the SMMU is further configured to organize the Configuration Cache memory as a content-addressable memory (CAM).

14. The system of claim 12, wherein the SMMU is further configured to store at least one entry associated with the multiple memory lookup cycle virtual address-to- physical address translation into the Configuration Cache memory, the at least one entry comprising a tag, an associated STE and an associated CD.

15. The system of claim 12, wherein the SMMU is further configured to perform a translation of the virtual address into the physical memory address utilizing the STE and the CD associated with the matching tag.

16. The system of claim 12, wherein the SMMU is further configured to submit a query tag, based on the associated tag, to the Configuration Cache memory for the search.

17. The system of claim 12, wherein the corresponding entry comprises (i) a translation tag comprising a translation valid field, a translation SID field, a translation SSV field, and a translation SSID field, and (ii) a translation data field comprising a translation STE and a translation CD.

18. The system of claim 12, wherein the SMMU is further configured to perform an STE invalidation operation by identifying entries having identical values in their respective SID fields and corresponding valid fields set to a value of 1, and resetting the corresponding valid fields of the identified entries to a value of 0.

19. The system of claim 12, wherein the SMMU is further configured to perform a CD invalidation operation by identifying entries having identical values in respective SID fields, identical values in respective SSID fields, corresponding valid fields set to a value of 1, and corresponding SSV fields set to a value of 1, and resetting the corresponding valid fields of the identified entries to a value of 0.

20. The system of claim 12, wherein the SMMU is further configured to (i) when an entry to be stored in the Configuration Cache memory has the SSV field set to 0, store the entry with the SSV field set to 0 and the SSID field set to 0, and (ii) while performing the CD invalidation operation, ignore the corresponding SSV fields for entries with respective SSID fields set to 0.

21. The system of claim 12, wherein 15 of the lowest significance bits of the SID field are ternary bits.

* * * * *